(12) United States Patent
Paulsen et al.

(10) Patent No.: US 7,119,687 B2
(45) Date of Patent: Oct. 10, 2006

(54) SYSTEM FOR TRACKING OBJECT LOCATIONS USING SELF-TRACKING TAGS

(75) Inventors: Torsten Paulsen, Feucht (DE); Heinrich Meyer, Nuremberg (DE); Farshid Arman, Lafayette, CA (US)

(73) Assignees: Siemens Technology-To-Business Center, LLC, Berkeley, CA (US); Siemens Aktiengesellschaft, Munich (DE)

( * ) Notice: Subject to any disclaimer, the term of this patent is extended or adjusted under 35 U.S.C. 154(b) by 163 days.

(21) Appl. No.: 10/869,177

(22) Filed: Jun. 15, 2004

(65) Prior Publication Data

US 2005/0116823 A1   Jun. 2, 2005

Related U.S. Application Data

(60) Provisional application No. 60/527,110, filed on Dec. 3, 2003.

(51) Int. Cl.
  G08B 13/14  (2006.01)
  G08B 1/08   (2006.01)
  H04Q 7/00   (2006.01)
  G01S 5/00   (2006.01)
  G01S 3/02   (2006.01)

(52) U.S. Cl. .............. 340/572.1; 342/357.08; 342/450; 340/539.13

(58) Field of Classification Search .......... 340/571, 340/572.1–572.9, 825.49, 539.13; 342/357.01, 342/357.09, 126, 450, 357.07, 357.08
See application file for complete search history.

(56) References Cited

U.S. PATENT DOCUMENTS

| 4,459,667 | A |   | 7/1984  | Takeuchi et al. |
| 5,119,104 | A | * | 6/1992  | Heller ................. 342/450 |
| 5,534,876 | A | * | 7/1996  | Erickson et al. ........ 342/387 |
| 5,583,776 | A |   | 12/1996 | Levi et al. |
| 5,724,265 | A |   | 3/1998  | Hutchings |
| 5,745,037 | A | * | 4/1998  | Guthrie et al. ......... 340/573.4 |
| 5,751,246 | A | * | 5/1998  | Hertel ................. 342/357.07 |
| 5,899,963 | A |   | 5/1999  | Hutchings |
| 5,920,261 | A |   | 7/1999  | Hughes et al. |
| 6,122,960 | A |   | 9/2000  | Hutchings et al. |
| 6,236,359 | B1 | * | 5/2001 | Watters et al. ......... 342/357.1 |
| 6,305,221 | B1 |   | 10/2001 | Hutchings |
| 6,512,787 | B1 |   | 1/2003 | Tung et al. |
| 6,972,682 | B1 | * | 12/2005 | Lareau et al. .......... 340/568.1 |
| 2002/0183979 | A1 |   | 12/2002 | Wildman |
| 2004/0021566 | A1 | * | 2/2004 | Hayashi et al. ........ 340/539.13 |
| 2005/0035862 | A1 | * | 2/2005 | Wildman et al. ....... 340/573.1 |

FOREIGN PATENT DOCUMENTS

DE          28 27 715 A1    1/1980

* cited by examiner

*Primary Examiner*—Daniel Wu
*Assistant Examiner*—Jennifer A Mehmood (57) ABSTRACT

An object tracking system includes a plurality of tags. Each tag includes a mechanism for transmitting a triangulation signal and a position signal that is indicative of a change of position of the respective tag in a time period since a respective reset event. A plurality of triangulation stations receive the triangulation signals from the tags. At least one antenna receives the position signals from the tags. A computer is coupled to the triangulation stations and to the antenna. The computer is programmed to switch between (a) a first tag location algorithm to determine a current location of one of the tags using a differential time of arrival procedure based on the triangulation signal, and (b) a second tag location algorithm to determine a current location of the tag based on the position signal transmitted by the tag and a previous known location of the tag.

15 Claims, 8 Drawing Sheets

SYSTEM FOR TRACKING OBJECT LOCATIONS USING SELF-TRACKING TAGS

CROSS-REFERENCE TO RELATED APPLICATION

This application claims priority under 35 U.S.C. § 119 to U.S. Provisional Patent Application Ser. No. 60/527,110, entitled "Autarkic Object Positioning and Locating System with MEMS-based Devices", filed in the name of Paulsen et al. on Dec. 3, 2003, the contents of which are hereby incorporated by reference in their entirety for all purposes.

BACKGROUND

The present disclosure relates generally to systems and tags used for tracking the locations of objects, and is more particularly concerned with an object tracking system in which more than one type of object tracking procedure is employed.

It can be highly advantageous in the environment of a factory to be able to keep track of the current locations of certain objects. For example, it may be desirable to keep track of the locations of tools, production equipment, inventory and/or the items being produced in the factory. Object location tracking is also potentially applicable to other environments, such as warehouses, vehicle parking lots, railroad yards, container terminals, and the like.

Figure 1:
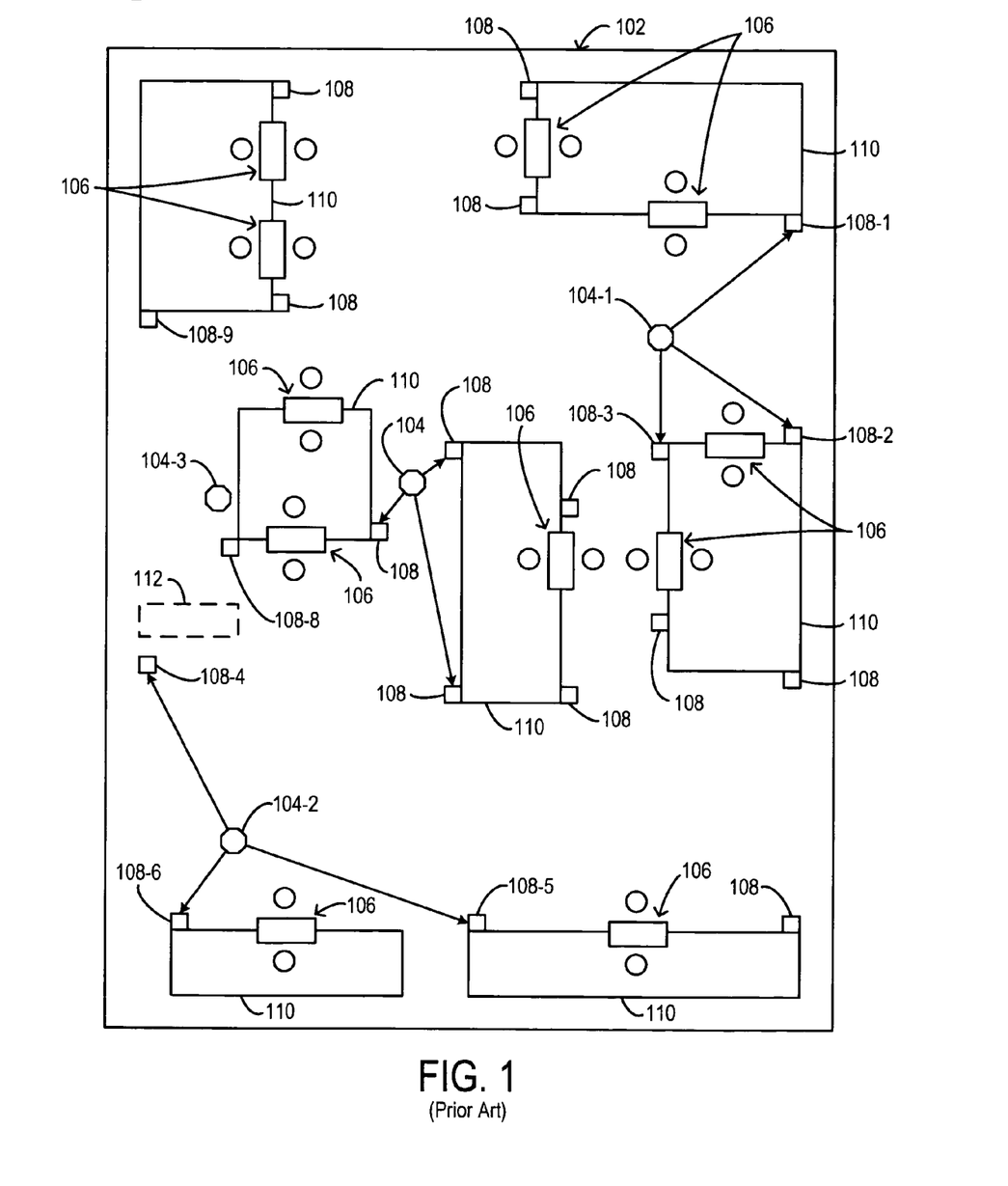
FIG. 1 is a schematic plan view representation of a conventional object tracking system.

FIG. 1 is a schematic plan view representation of a conventional object tracking system 100. The object tracking system 100 is installed in a factory facility 102. The object tracking system 100 utilizes tags 104 (represented in the drawing by octagonal symbols that also serve to represent objects, not separately shown, to which the tags are affixed to permit tracking of the objects).

The object tracking system 100 utilizes two different procedures—proximity detection and triangulation—to track the tags 104. Interrogation gates 106 are used for proximity detection, and triangulation stations 108 allow tag locations to be determined by triangulation. Another significant element of the system 100, but not shown in the drawing, is a central computer that is coupled by signal paths (also not shown) to the interrogation gates 106 and triangulation stations 108.

In accordance with conventional practices, a tag 104 that is in proximity to an interrogation gate 106 receives an interrogation signal from the interrogation gate and responds to the interrogation signal by transmitting a response signal that includes a tag identification code that uniquely identifies the tag. The interrogation gate then effectively reports to the central computer that the particular tag is at the interrogation gate. The interaction between the tag and the interrogation gate may be in accordance with conventional RFID (radio frequency identification) practices. In other variations, the interrogation gate may read a barcode or the like from the tag.

The tags 104 send out signals at brief regular intervals which are received by triangulation station 108. By using the triangulation stations 108, the central computer utilizes a triangulation procedure to determine the location of tags that are not in proximity to one of the interrogation gates 106. More specifically, the central computer may use a differential time of arrival (DTOA) procedure in which a tag ID signal transmitted by a tag 104 is received by three or more of the triangulation stations 108. Differences in the timing at which the tag ID signal is received at each triangulation station are used by the central computer to calculate the location of the tag, based on the locations of the stations 108 which received the tag ID signal. For example, in FIG. 1, a tag ID signal transmitted by tag 104-1 is received by line-of-sight at triangulation stations 108-1, 108-2, 108-3, thereby allowing the location of tag 104-1 to be determined by triangulation. Similarly, a tag ID signal transmitted by tag 104-2 is received by triangulation stations 108-4, 108-5, 108-6 so that the location of tag 104-2 can be determined by triangulation.

The "MOBY R" object locating system available from Siemens A G, an assignee hereof, is an example of a system that employs DTOA to locate objects.

In some examples of a conventional object tracking system, the number of tags may be in the thousands, and the number of interrogation gates and/or triangulation stations may be in the dozens.

An object tracking system as illustrated in FIG. 1 often operates effectively to achieve its intended purposes. However, in some cases such systems may exhibit drawbacks that it would be desirable to address. For example, triangulation by DTOA requires line-of-sight transmission from a tag to three or more triangulation stations and thus works best in open, unobstructed areas. Disadvantageously, some factory environments may have a significant number of obstructions to tag ID signal transmission, such as the obstructions 110 shown in FIG. 1. When obstructions are present, it is usually necessary to provide an increased number of triangulation stations to avoid "dead spots" in which tags cannot be detected by triangulation. This increases the cost of the tracking system. Furthermore, the presence of obstructions increases the amount of time required for planning the system and determining the locations at which triangulation stations are to be installed. This too increases the cost of the system, and also increases the time required to deploy the system.

Moreover, "temporary" obstructions, such as loaded pallets, trucks, forklifts, etc., may interfere with triangulation capabilities of the system. Consider for example the case of tag 104-3 shown in FIG. 1. It is assumed that a temporary obstruction is placed as indicated in phantom at 112, blocking the line-of-sight transmission path from tag 104-3 to triangulation station 108-4. As a result, line-of-sight transmission is possible from tag 104-3 only to two triangulation stations, namely stations 108-7 and 108-8. Consequently, the location of tag 104-3 cannot currently be determined by DTOA.

Even in the absence of such problems, reflections of tag ID signal transmissions may adversely affect performance of the DTOA procedure.

In simpler object tracking systems, only interrogation gates are employed. However, in such systems, the location of an object is known only when it is in proximity to an interrogation gate. If, for example, a gate is provided at the entrance to a large enclosed area (e.g., a warehouse or parking lot), it may be possible to determine that an object is in the enclosed area, but finding the object within that area may be difficult, and is not aided by the object tracking system.

SUMMARY

Apparatus and methods are therefore presented for an improved object tracking system.

According to some embodiments, a system includes a plurality of tags. Each tag includes one or more mechanisms for transmitting a triangulation signal and a position signal. The position signal is indicative of a change of position of the respective tag in a time period since a respective reset event. The system also includes a plurality of triangulation stations for receiving the triangulation signals from the tags. Also included in the system is at least one antenna for receiving the position signals from the tags. The system further includes a computer coupled to the triangulation stations and to the at least one antenna. The computer is programmed to switch between (a) a first tag location algorithm in which the computer determines a current location of one of the tags using a differential time of arrival procedure based on the triangulation signal transmitted by the tag in question, the triangulation signal being received by at least some of the triangulation stations, and (b) a second tag location algorithm in which the computer determines a current location of the tag in question based on the position signal transmitted by the tag and a previous known location of the tag.

According to some embodiments, a method includes (a) selectively employing a differential time of arrival procedure to determine a current location of a tag based on a triangulation signal transmitted by the tag, and (b) determining a current location of the tag based on a position signal transmitted by the tag and a previous known location of the tag. The latter determination may be performed at all times but used only at a time when it is determined that the triangulation signal from the tag is not received in a manner to permit performing the differential time of arrival procedure according to some predetermined metrics.

According to some embodiments, a tag includes a housing and a first transmitting mechanism in the housing for transmitting a triangulation signal. The tag also includes at least one sensor in the housing. The at least one sensor includes at least one acceleration sensor. Also included in the tag is a calculating mechanism in the housing to receive sensor information from the at least one sensor and for calculating position data for the tag based on the sensor information. The tag further includes a second transmitting mechanism in the housing to selectively transmit the position data calculated by the calculating mechanism.

According to some embodiments, a tag includes a housing and a response mechanism in the housing. The response mechanism is for receiving an interrogation signal from an interrogation gate and for transmitting, in response to receipt of the interrogation signal, an identification code that uniquely identifies the tag. The tag also includes at least one sensor in the housing. The at least one sensor include at least one acceleration sensor. Also included in the tag is a calculating mechanism in the housing. The calculating mechanism is for receiving sensor information from the at least one sensor and for calculating a current direction of motion of the tag based on the sensor information. The response mechanism transmits to the interrogation gate data indicative of the current direction of motion calculated by the calculating mechanism.

According to some embodiments, a method includes determining a current location of a tag based on a signal from an interrogation gate when the tag is in proximity to the interrogation gate, and, at a time when the tag is not in proximity to any interrogation gate, determining a current location of the tag based on a position signal transmitted by the tag and a previous known location of the tag.

According to some embodiments, a system includes a plurality of tags. Each tag includes at least one mechanism for transmitting a response signal and a position signal. The position signal is indicative of a change of position of the respective tag in a time period since a respective reset event. The system also includes a plurality of interrogation gates, and at least one antenna for receiving the position signals from the tags. The system further includes a computer coupled to the interrogation gates and to the at least one antenna. The computer is programmed to determine a current location of one of the tags based on a signal from one of the interrogation gates at a time when the tag in question is in proximity to the interrogation gate in question. The computer is further programmed to determine, at a time when the tag is not in proximity to any of the interrogation gates, a current location of the tag in question based on the respective position signal transmitted by the tag and a previous known location of the tag.

BRIEF DESCRIPTION OF THE DRAWINGS

Further aspects of the instant system will be more readily appreciated upon review of the detailed description of the preferred embodiments included below when taken in conjunction with the accompanying drawings, of which.

DETAILED DESCRIPTION OF SPECIFIC EMBODIMENTS

According to some embodiments, an object tracking system utilizes tags that include acceleration sensors and/or other sensors, such as gyroscopes, that allow the tag to track its own changes in position and to store information indicative of the changes in position of the tag. The tag position change information may be uploaded to a central server computer from the tag. The central server computer may use the position change information uploaded from the tag, plus a previous known location for the tag, to determine the tag's current location. At other times, the object tracking system may utilize DTOA or a signal from an interrogation gate to determine the current location of the tag. The system may switch back and forth between using the position information from the tag and using DTOA, depending on whether the tag is satisfactorily located for DTOA.

As used herein and in the appended claims, "triangulation signal" refers to a signal transmitted by a tag to a plurality of fixed receiving stations (e.g., triangulation stations) to allow a calculating device (e.g., a computer) coupled to the receiving stations to calculate the current location of the tag by a differential time of arrival (DTOA) technique.

As used herein and in the appended claims, "triangulation station" refers to a station adapted to receive a triangulation signal.

As used herein and in the appended claims, "interrogation gate" refers to a device or group of devices that functions to (a) send a signal to a tag in proximity to the device or devices to induce the tag to transmit a tag identification signal, and/or (b) to receive such tag identification signal from a tag in proximity to the device or devices.

As used herein and in the appended claims, "response signal" refers to a signal transmitted by a tag in response to a signal from an interrogation gate.

Figure 2:
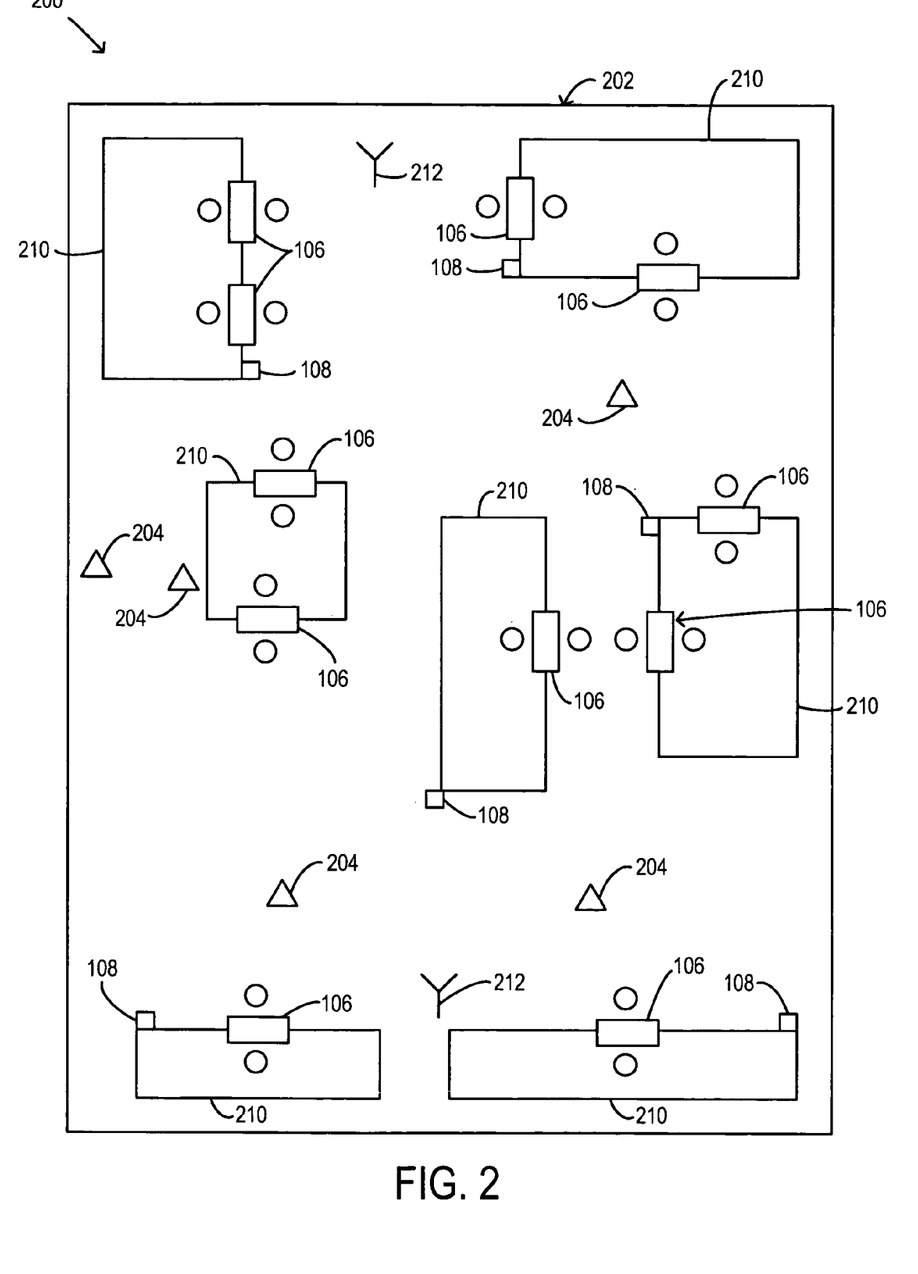
FIG. 2 is a schematic plan view representation of an object tracking system in accordance with some aspects of the invention.

FIG. 2 is a schematic plan view representation of an object tracking system 200 in accordance with some aspects of the invention.

The object tracking system 200 is installed, at least in part, in a factory building 202. The system 200 includes tags 204, represented in the drawing by small triangles. (The triangles may also be considered to represent objects to which the respective tags are affixed to permit tracking of the objects. The objects are not separately shown.) In some exemplary embodiments, the factory building 202 is employed for assembly of motor vehicles, and each tag 204 is affixed to a respective vehicle that is being assembled or has been assembled at the factory building 202. Although only a few tags 204 are indicated for purposes of illustration in FIG. 2, in practice the number of tags included in the system 200 may be in the thousands. The tags may have features provided in accordance with some aspects of the inventions, and are described in more detail below.

The object tracking system 200 also includes interrogation gates 106 and triangulation stations 108, which may be essentially the same as, or generally similar to, the conventional items of the same names discussed above in connection with FIG. 1. It will be noted that the number of triangulation stations shown in FIG. 2 is substantially less than the number shown in FIG. 1, notwithstanding that the building 202 has substantially the same types of obstructions 210 as the building of FIG. 1.

Also included in the object tracking system in accordance with some aspects of the invention are antennas 212, which are provided to receive from the tags 204 tag self-tracking position information, as described in more detail below. Although not separately shown, each antenna may have associated therewith appropriate receive circuitry as well as a capability for buffering data and relaying the data to a central (server) computer, which is discussed below. Thus each antenna symbol 212 may be considered to represent a receiver for receiving tag self-tracking position information transmitted by tags 204.

Figure 3:
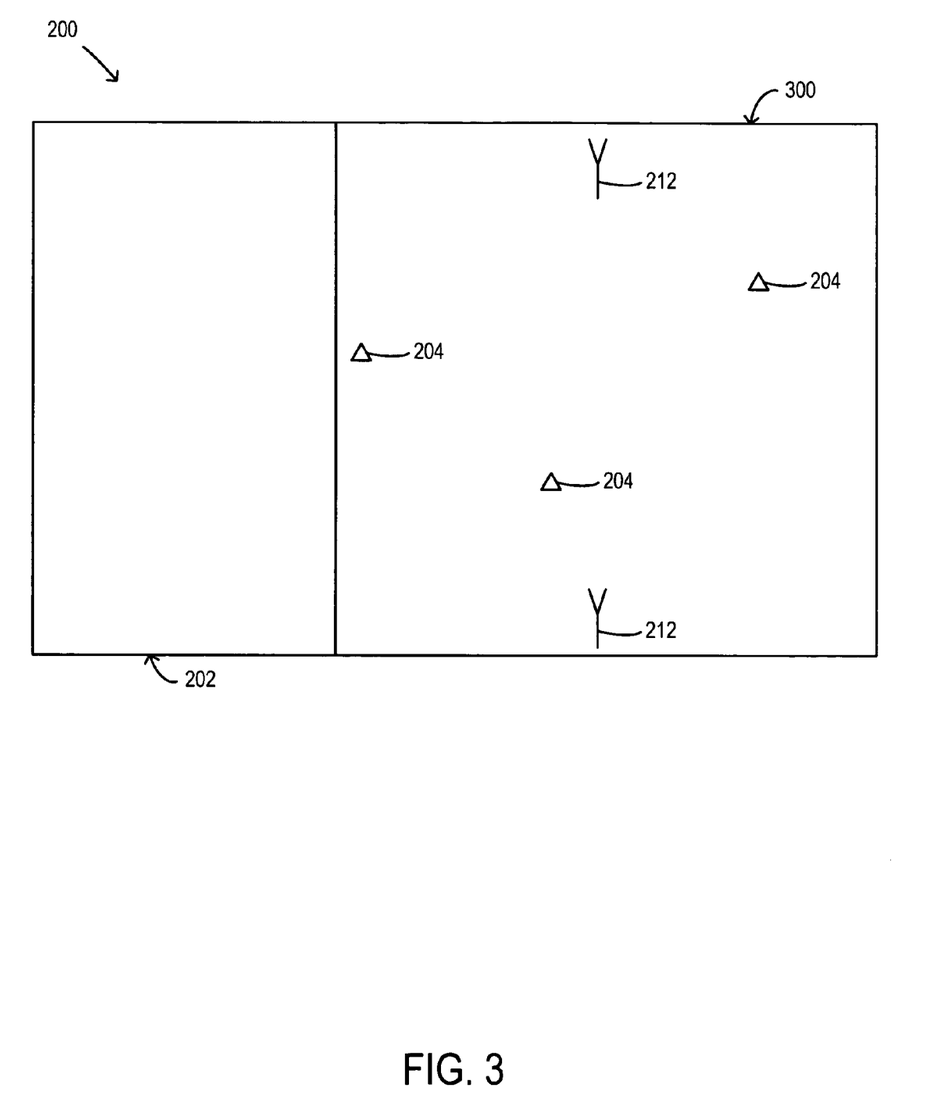
FIG. 3 is a schematic plan view representation of an alternative embodiment of the object tracking system of FIG. 2.

FIG. 3 illustrates, in the form of a schematic plan view, an alternative embodiment of the object tracking system 200, including the factory building 202 shown in FIG. 2, together with an associated parking, storage and/or testing lot 300. It will be observed that the lot 300 has tags 204 of the object tracking system present therein, and that antennas 212 of the object tracking system are installed in the lot 300. Although not shown in detail, it may be assumed that the factory building 202 is equipped with system components as illustrated in FIG. 2.

Figure 4:
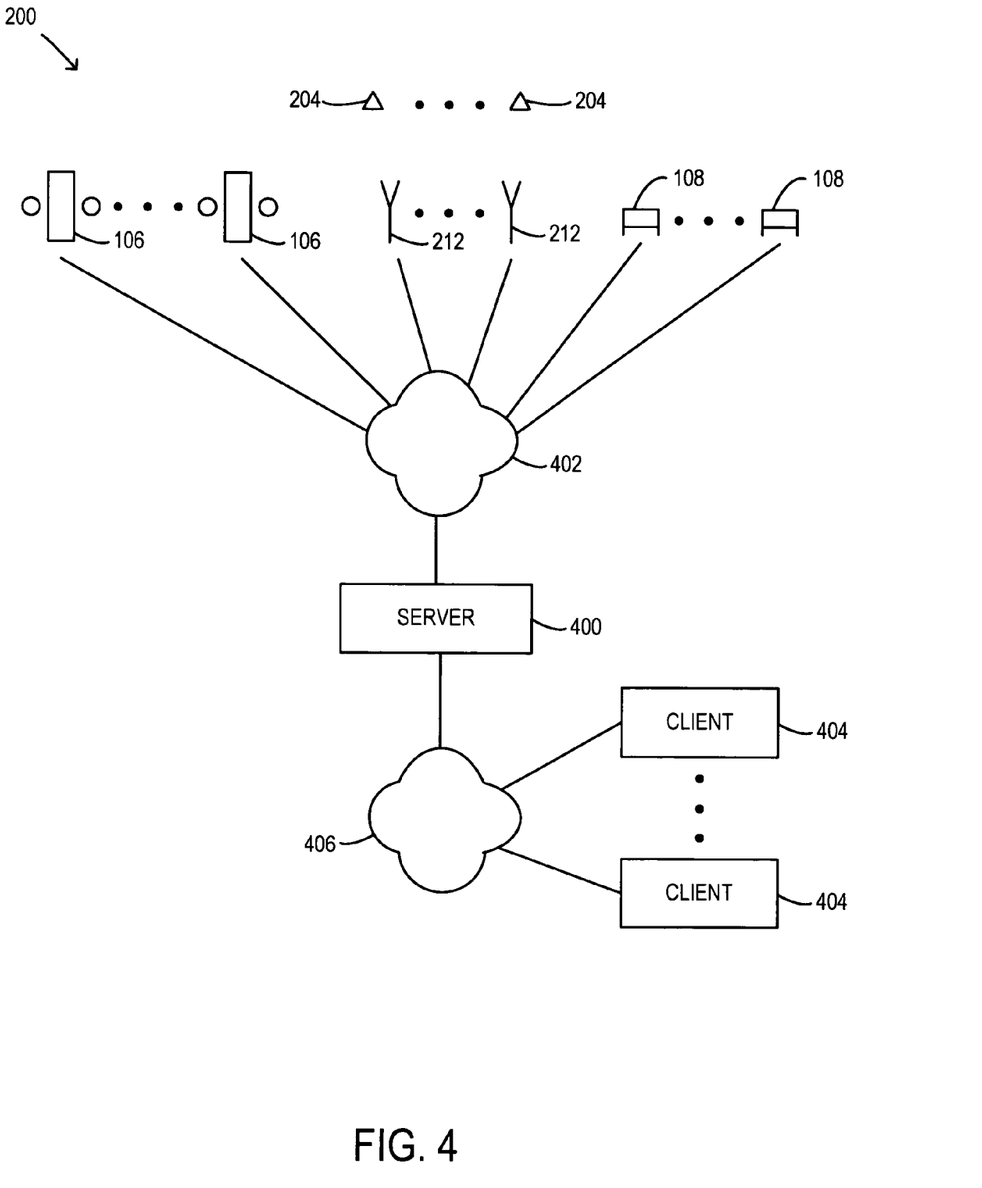
FIG. 4 is a diagram that illustrates components of the object tracking system of FIG. 2 or 3.

FIG. 4 is a diagrammatic view of the object tracking system 200, showing additional system components. Thus, the system 200 further includes a server computer 400 which is coupled to the interrogation gates 106, the antennas 212 and the triangulation stations 108 via a tracking signal transmission network 402. Details of the server computer 400 will be described below.

The system 200 also includes client computers 404 that are, at least on occasion, coupled to the server computer 400 via a data communication network 406. The client computers 404 may be, in some embodiments, suitably programmed personal computers. The server computer 400 and the client computers 404 operate such that the client computers are able to retrieve from the server computer 400 and to display to users of the client computers information regarding the current locations of objects to which the markers 204 are affixed.

Although the networks 402, 406 are shown as separate, the two networks may be combined in some embodiments. Alternatively, three or more networks may be employed in some embodiments and/or point-to-point signal paths may be provided in some or all cases between server 400 and other system components.

Figure 5:
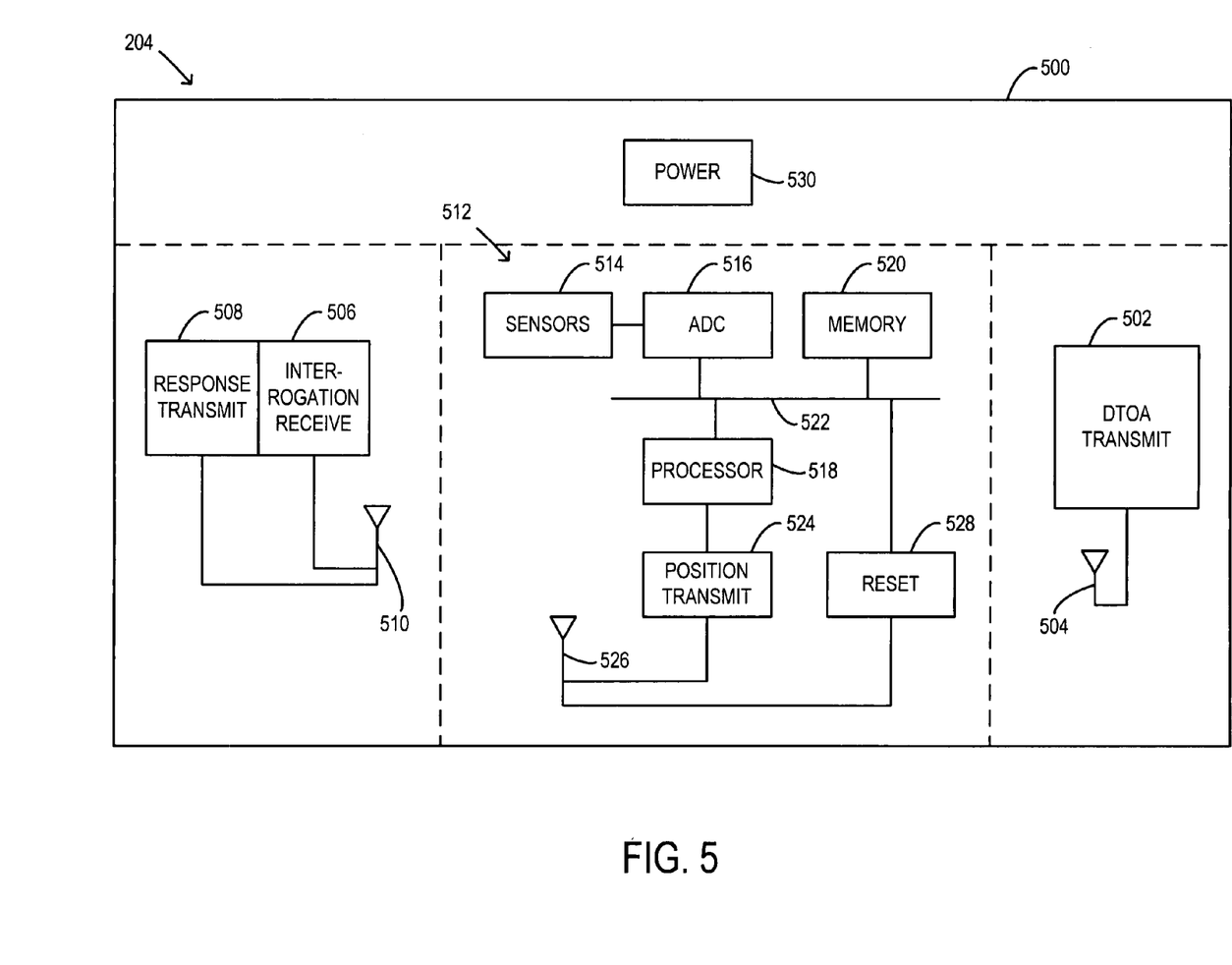
FIG. 5 is block diagram of a typical tag that may be employed in accordance with some embodiments of the invention as part of the object tracking system according to one or more of FIGS. 2–4.

FIG. 5 is block diagram of a typical one of the tags 204, as provided in accordance with some aspects of the invention.

The tag 204 includes a housing (schematically indicated at 500) which may contain all the other components of the tag 204.

The tag 204 may include appropriate circuitry to perform all functions performed by the conventional tags 104 described above in connection with the conventional object tracking system 100 of FIG. 1. Such circuitry is represented, in part, in FIG. 5 by a DTOA transmit block 502 and an antenna 504 coupled to the DTOA transmit block 502. The DTOA transmit block 502 may operate in accordance with conventional practices to transmit, from time to time, via the antenna 504, a triangulation signal that is suitable to be received by the triangulation stations 108. Receipt of the triangulation signal by three or more of the triangulation stations 108 allows the server computer 400 to determine the current location of the tag 204 by a conventional DTOA procedure. It will be understood that the triangulation signal may include an identification code that uniquely identifies the particular tag 204.

The block 502 and the antenna 504 may transmit the triangulation signal at regular time intervals and/or in response to a polling signal received by the tag 204. Accordingly the block 502 may include a capability (not separately indicated) for receiving and responding to a polling signal. The polling signal may be transmitted to the tag 204 by, e.g., one or more of the triangulation stations 106.

Another portion of circuitry in the tag 204 that performs conventional functionality is represented in FIG. 5 by an interrogation signal receive block 506, a response signal transmit block 508, and an antenna 510 that is coupled to the blocks 506, 508. The blocks 506, 508 and the antenna 510 may function so that the tag 204 may interact, from time to time, with an interrogation gate 106 to which the tag 204 is currently in proximity. That is, the blocks 506, 508 and the antenna 510 may allow the tag 204 to receive the interrogation signal from a proximate interrogation gate and to transmit a response signal to the proximate interrogation gate in response to receiving the interrogation signal. It will be appreciated that the response signal may include a tag identification code that uniquely identifies the tag 204. This code may be the same as a code sent by the DTOA transmit block 502.

The blocks 506 and 508 may be constituted in some embodiments by conventional RFID transponder circuitry. In some embodiments, the antennas 504, 510 may be constituted by a single antenna; similarly, there may be at least a partial overlap or sharing of circuit components by the blocks 506, 508 on one hand and the block 502 on the other hand.

The tag 204 further includes, in accordance with some aspects of the invention, a self-tracking position module 512 by which the tag 204 is able to track its own movement. The module 512 includes a plurality of sensors, indicated at 514, which may include three or more acceleration sensors and/or at least one angle or direction sensing device. The angle or direction sensing device may, for example, function as a gyroscope. In some embodiments, one or more of the sensors may have been fabricated by use of conventional MEMS (micro-electro-mechanical systems) technology on a semiconductor substrate or other suitable substrate (not separately shown).

The module 512 also includes one or more analog-to-digital converters 516 coupled to the sensors 514. The ADC(s) 516 function to receive analog input signals from at least one of the sensors and to convert the analog input signals into digital signals. ADC(s) 516 may also effectively include digital data buffering capabilities, which are not separately indicated.

Also included in the module 512 are a processor 518 and a memory 520 that are coupled to the ADC(s) 516 via a data bus 522. The processor 518 may, in some embodiments, be a conventional microprocessor or microcontroller; alternatively the processor may be constituted as processing circuitry that is part of a custom circuit (e.g., an ASIC). The processor 518 may calculate, based on input received from the sensors 514, changes in position experienced by the tag 204. The memory 520 may function as a program store for the processor 518 and as working memory, and may also store data generated by the processor to indicate changes in position of the tag 204. It may also include pre-stored/pre-configured data, such as motion models.

The module 512 further includes a position data transmit block 524 coupled between the processor 518 and an antenna 526. As will be seen, the module 512 may transmit the position data calculated by the processor 518 to one or more of the antennas 212 (FIGS. 2–4) via the position data transmit block 524 and the antenna 526. The transmission from the module 512 may also include the tag's unique identification code, which may be the same as the code utilized for DTOA tracking and for interaction with interrogation gates.

The module 512 also includes a reset block 528 which may be coupled to the antenna 526 to receive a reset signal or other relevant signal and to supply a corresponding input to processor 518 (via bus 522), so that processor 518 causes the position data stored in the memory 520 to be cleared (reset) so that the self-tracking function of the module 512 starts anew.

Further details of operation of the self-tracking position module 512 will be described below.

Some portions of the module 512 may overlap and/or be shared with other portions of the tag 204. For example, the antenna 526 may be the same as one or both antennas 504, 510. At least some of the circuitry of position data transmit block 524 may be shared with either or both of blocks 502, 508. Furthermore, the processor 518 may operate to provide some of the functionality of one or more of blocks 502, 506, 508. The unique tag identification code referred to above in connection with blocks 502, 508 may, in some embodiments, be stored in the memory 520 and may be retrieved from the memory 520 when needed for transmission as part of the triangulation signal transmitted by block 502 and/or when needed for transmission as part of the response signal transmitted by block 508.

The tag 204 also includes a power supply 530 which is a source of power for other electrical or electronic components of the tag 204. In some embodiments the power supply 530 is constituted at least in part by a battery. In other embodiments, the power supply may be coupled to a power source outside of the tag 204 to convert the external power for use by the tag components. For example, if the object to which the tag is affixed is a motor vehicle, the power supply 530 may be coupled (removably or otherwise) to the vehicle electrical power system (e.g. to the vehicle main battery). To simplify the drawing, connections between the power supply 530 and other components of the tag 204 are omitted.

Figure 6:
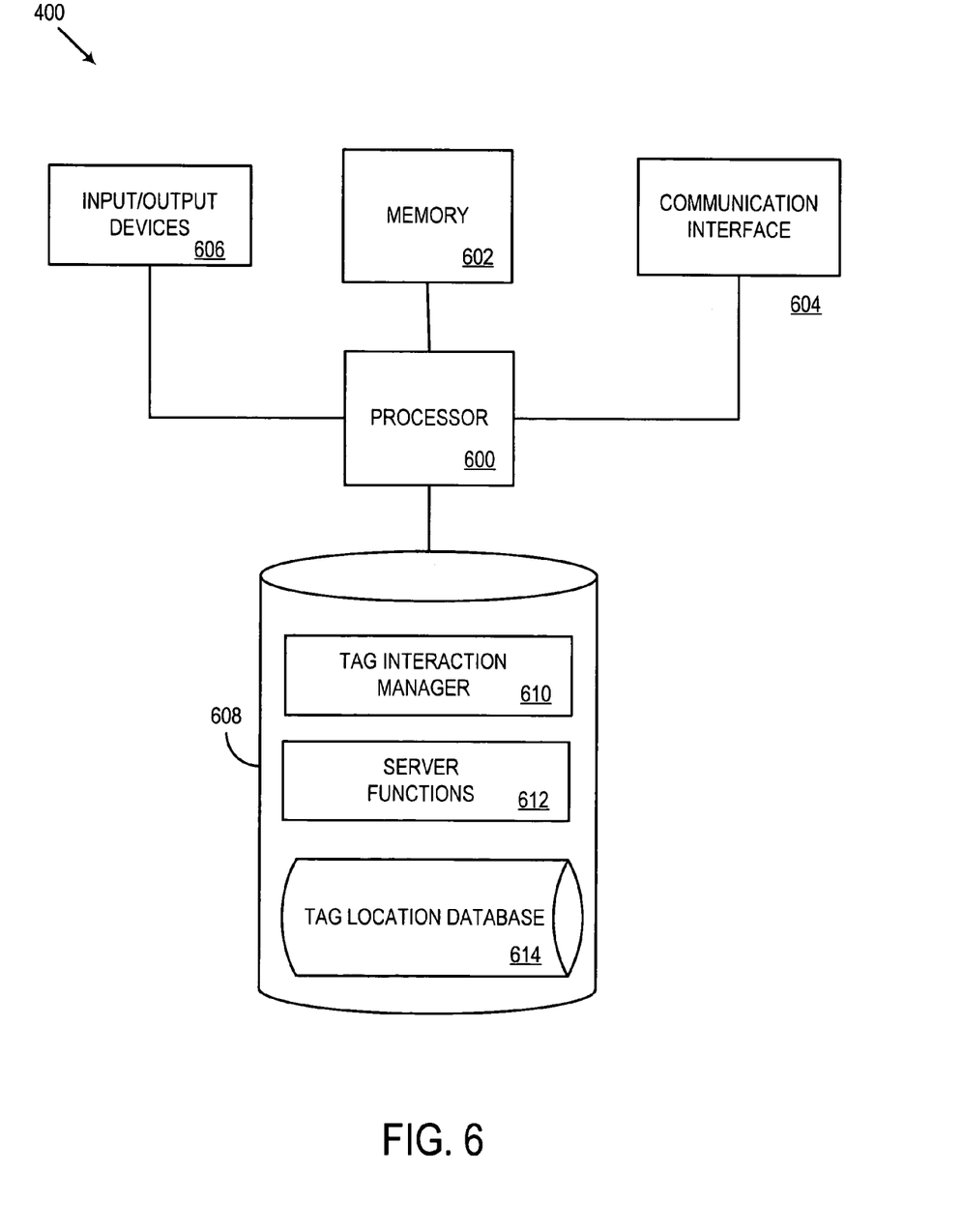
FIG. 6 is a block diagram of a server computer that may be employed as part of the object tracking system according to one or more of FIGS. 2–4.

FIG. 6 is a block diagram of the server computer 400. In some embodiments, the server may, in terms of its hardware aspects, be entirely conventional. The server 400 includes one or more processors 600, which may be a conventional microprocessor or microprocessors. Also included in server 400 are memory 602, one or more communication interfaces 604, and input/output devices 606, all of which are in communication with the processor 600. The memory 602 may be, in some embodiments, one or more of RAM, ROM, flash memory, etc., and may serve as one or more of working memory, program storage memory, etc. The communication interfaces 604 allow the server 400 to exchange data with the client computers 404 (FIG. 4) and to receive tag position information and/or input signals from the interrogation gates 106, the triangulation stations 108 and the antennas 212. Command, status and control signals to and/or from the interrogation gates 106, the triangulation stations 108 and the antennas 212 may also be exchanged with the server 400 via the communication interfaces 604.

The I/O devices 606 may include one or more conventional devices such as displays, printers, keyboards, a mouse, a trackball, etc.

Also included in the server 400, and in communication with the processor 600, is a mass storage device 608. Mass storage device 608 may be constituted by one or magnetic storage devices, such as hard disks, one or more optical storage devices, and/or solid state storage. The mass storage 608 may store an application or applications 610, by which the server 400 manages interactions with the tags 204, and an application or applications 612, by which the server 400 acts as a server with respect to client computers 404. There may also be stored in the mass storage 608 a database 614, in which an up-to-date record may be maintained of the current and/or last known locations of all of the tags 204. The same or another database may also store correspondences between tag identifiers and object identifiers, if the objects are identified by codes independent of the tag identification codes.

Operation of a typical one of the tags 204 will now be described with reference to FIG. 7, which is a flow chart that illustrates functions performed and/or overseen by the processor 518 (FIG. 5) of the tag 204. The functions indicated in FIG. 7 relate only to generating, storing and transmitting self-tracking position data by the tag; the processor 518 and/or other portions of the tag may also be operable to provide conventional triangulation signals and/or to respond to interrogation gates, as described in connection with FIG. 5 and elsewhere herein.

Figure 7:
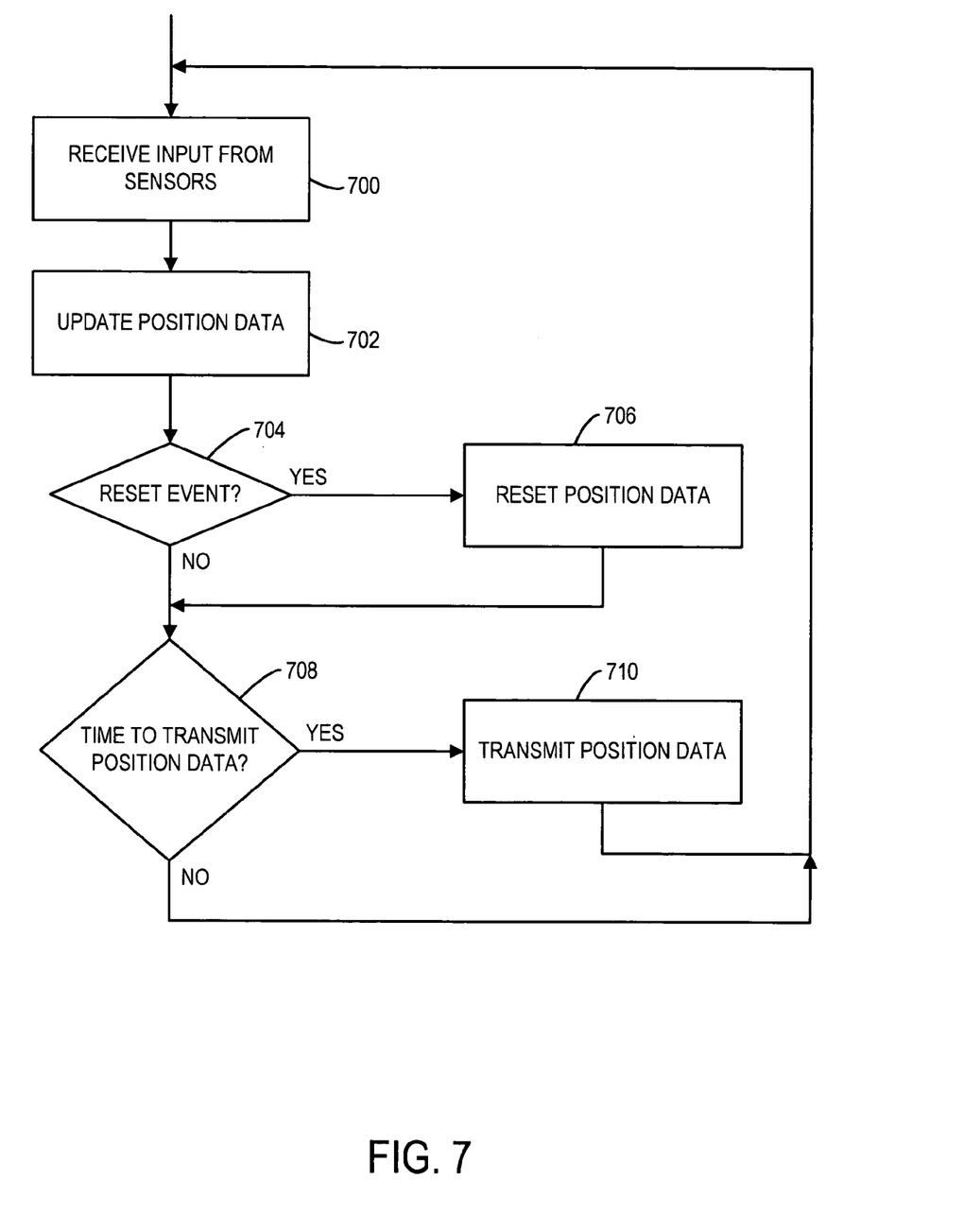
FIG. 7 is a flow chart that illustrates a process that may be performed in accordance of some embodiments of the invention by the tag of FIG. 5.

Initially in the process of FIG. 7, as indicated at 700, the processor 518 may receive input signals from one or more of the sensors 514 (FIG. 5). Such input may indicate acceleration of the tag, for example, along one or more of three mutually orthogonal axes of a frame of reference of the tag; in addition or alternatively, such input may indicate a change of orientation of the tag.

By double integrating the indicated acceleration input signals, while also taking into account changes in orientation of the tag, error models, and motion models, the processor 518 is able to calculate positional displacements of the tag relative to a given starting point, which may be established on the basis of a reset event, as discussed below. On the basis of such calculations, the processor updates the tag's self-tracking position data, as stored in the memory 520 (FIG. 5), to reflect changes in the tag's location. The calculation of self-tracking position data and storage of updated self-tracking position data are indicated at 702 in FIG. 7.

Following 702 is a decision 704, at which the processor 518 determines whether a reset event has occurred. In some embodiments, a reset event occurs when the tag receives a signal from the system to indicate that the system has a fix on the tag's current location. Such a location fix may come about as a result of any one of the tag interacting with an interrogation gate, a successfull DTOA operation with respect to the tag, or the system's accepting from the tag the currently updated tag self-tracking position data.

If a positive determination is made at 704, i.e., if it is determined that a reset event has occurred, then the processor resets (clears) the currently stored tag self-tracking position data to indicate that the tag is now at a new starting point for future self-tracking operation. The resetting of the stored position data is indicated at 706.

A decision 708 follows 706, or immediately follows 704 if a negative determination is made at 704. At decision 708, the processor 518 determines whether it is time for the tag to transmit the currently stored self-tracking position data. The timing of transmission of the self-tracking position data may be at regular time intervals timed by the tag and/or after a predetermined amount of self-tracked movement of the tag and/or in response to an interrogation signal from the system or may be when the object has come to a standstill. If a positive determination is made at 708, then the tag transmits a signal or signals to indicate the identification code for the tag and the currently stored self-tracking position data, as indicated at 710. The process of FIG. 7 then loops back to 700. Alternatively, if a negative determination is made at 708, the process loops back to 700 without transmitting the self-tracking position data.

It should be understood that FIG. 7 and the above discussion thereof do not imply a fixed order of performing the functions of FIG. 7, and that such functions may be performed in any order that is practicable.

Operation of the server computer 400 will now be described with reference to FIG. 8, which is a flow chart that illustrates some aspects of the tag interaction manager application 610 (FIG. 6) which runs on the server computer 400.

As indicated at 800, the following functions may be performed for each tag 204, or at least for each tag that is registered in an active status with the system.

In a decision at 802, it is determined whether a current location for the tag in question can be determined by either a DTOA process or by detection via an interrogation gate. If a positive determination is made at 802, then, as indicated at 804, the server computer determines the current location of the tag by using a conventional DTOA procedure or based on the tag's interaction with an interrogation gate, as indicated by a signal received by the interrogation gate in question. (As a practical matter, 802 and 804 may be effectively combined. That is, a positive determination may continue to be made at 802 as long as the server computer is able to maintain an effective fix on the tag's current position using DTOA or input from one or another of the interrogation gates.) Upon the determination of the tag's current position at 804, the server computer causes a reset signal to be sent to the tag, as indicated at 806, to trigger a reset event at the tag. The reset signal may be sent by any one or more of an interrogation gate 106, a triangulation station 108 or an antenna 212 or by another broadcast antenna or antennas, which are not shown. In some embodiments, the tag may automatically reset or be reset upon interaction with an interrogation gate, and without action of the server computer in such cases.

If a negative determination is made at 802, i.e., if it is determined that the tag's location cannot be determined by DTOA or by interaction with an interrogation gate, then, as indicated at 808, the server switches into a mode in which it receives from the tag, via one or more antenna 212, the tag self-tracking position information that the tag has stored therein. Then, as indicated at 810, the server determines the current location of the tag based on the tag self-tracking position information received at 808 and based on the tag's last known position, as stored in the tag location database 614 (FIG. 6), which may have been determined based on any one of a DTOA procedure, interaction by the tag with an interrogation gate, or previous use of tag self-tracking position information by the server.

Following 810, the server may cause a reset signal to be sent to the tag, as indicated at 806.

Figure 8:
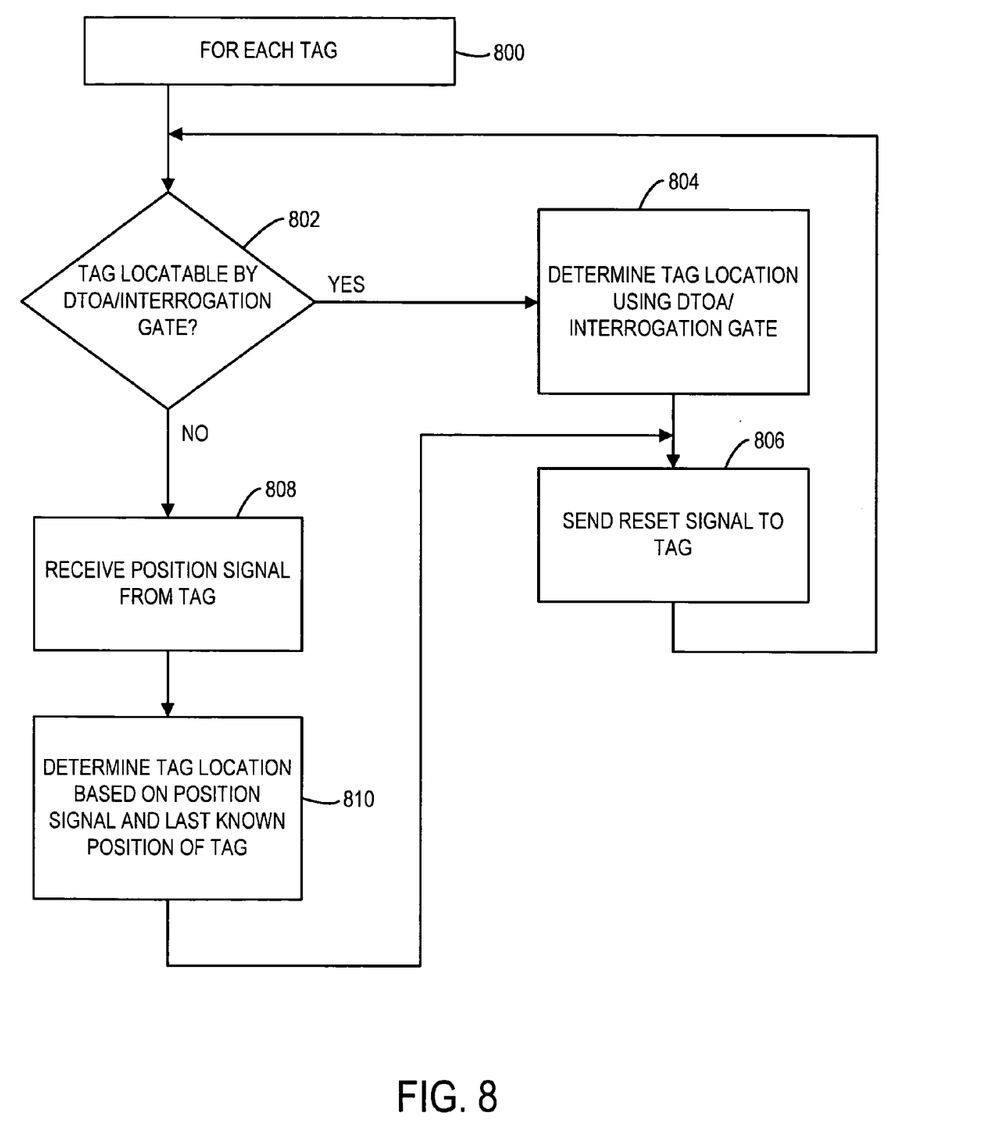
FIG. 8 is a flow chart of a process that may be performed in accordance with some embodiments of the invention by the server computer of FIG. 6.

It should be understood that FIG. 8 and the above discussion thereof do not imply a fixed order of performing the functions of FIG. 8, and that such functions may be performed in any order that is practicable.

The server may perform functions beyond those indicated in FIG. 8. For example, the server may make the current tag locations from the tag location database 614 available to the client computers 404 upon request from the client computers 404, so that users of the system may use the client computers to determine the current locations of tags, and/or the current locations of objects to which the tags are affixed. The tag location database 614 and/or another database stored in the server or in one or more of the client computers may indicate associations between particular tags and the objects to which they are affixed.

In addition, the server may operate to permit tags to be registered as active with the system or for tags to be removed from active status. The server may also operate to allow associations to be recorded between tags and objects to which they are affixed.

Since the system can switch between determining object locations based on tag self-tracking information and other location determining techniques, the system can reliably track objects with reduced reliance on DTOA procedures. The number of triangulation stations can be reduced, thereby lowering the cost of the system, while only a relatively few antennas 212 may be required to receive the self-tracking information from the tags. One advantage of the use of the tag self-tracking information is that reflections of the tag signals which contain the self-tracking information may aid in allowing the signals to be received by the antennas 212. In general, there may be considerable flexibility in the placement of the antennas 212.

In other embodiments, the triangulation stations and DTOA tracking of tags may be dispensed with entirely, in favor of reliance on interrogation gates and tag self-tracking. This may lead to reduced system cost, while still providing adequate object tracking. In some embodiments, resetting of the tag self-tracking information may occur only at interrogation gates. In addition, or alternatively, the tag self-tracking information may be received, in some embodiments, only at interrogation stations. In the latter cases, tags may carry information allowing for historical tracing and documentation of the movements of an object to which the tag is attached.

In embodiments in which the tags are to store a record of the movement of associated objects, resetting of the tag self-tracking information may be omitted, or an active self-tracking position information store may be reset without resetting a historical movement information store in the tag.

In other embodiments, the self-tracking module of the tags may operate to provide a current direction of movement of the tags. This may be done in addition to or instead of tracking changes in the tag's position. When a tag passes through an interrogation gate, the information from the tag which indicates direction of movement may be transmitted to the gate, so that the system may detect in which direction the tag is moving through the gate. This may make it unnecessary to provide two gates at each checkpoint, as has been the conventional practice when it is desired to detect the tag's direction of movement through the checkpoint.

In still other embodiments, DTOA tracking and tag self-tracking are employed, but interrogation gates are omitted.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A system comprising:
    a plurality of tags, each tag including means for transmitting a triangulation signal and a position signal, the position signal indicative of a change of position of the respective tag in a time period since a respective reset event;
    a plurality of triangulation stations for receiving the triangulation signals from the tags;
    at least one antenna for receiving the position signals from the tags; and
    a computer coupled to the triangulation stations and to the at least one antenna, the computer programmed to switch between:
        (a) a first tag location algorithm in which the computer determines a current location of one of the tags using a differential time of arrival procedure based on the triangulation signal transmitted by said one of the tags and received by at least some of the triangulation stations; and
        (b) a second tag location algorithm in which the computer determines a current location of said one of the tags based on the position signal transmitted by said one of the tags and a previous known position of said one of the tags.

2. A system according to claim 1, wherein the computer is a server computer installed at a fixed location.

3. A system according to claim 1, further comprising:
    at least one client computer coupled to the server computer to allow a user of the client computer to query the server computer as to a current location of at least one of the tags.

4. A system according to claim 1, wherein each of the tags includes:
    at least one sensor including at least one acceleration sensor; and
    generating means for generating said position signal based on information from said at least one sensor.

5. A system according to claim 4, further comprising:
    reset means for indicating to said generating means occurrence of said respective reset event.

6. A system according to claim 4, wherein the at least one sensor includes a gyroscope.

7. A system according to claim 1, further comprising:
    at least one interrogation gate coupled to the computer.

8. A tag comprising:
    a housing;
    first transmitting means in said housing for transmitting a triangulation signal;
    at least one sensor in the housing, said at least one sensor including at least one acceleration sensor;
    calculating means in said housing for receiving sensor information from said at least one sensor and for calculating position data for the tag based on the sensor information; and
    second transmitting means in said housing for selectively transmitting said position data calculated by said calculating means.

9. A tag according to claim 8, wherein the first transmitting means transmits as part of the triangulation signal an identification code that uniquely identifies the tag.

10. A tag according to claim 9, further comprising:
    response means in said housing for receiving an interrogation signal from an interrogation gate and for transmitting said identification code in response to receipt of said interrogation signal.

11. A tag according to claim 10, further comprising:
    reset means coupled to said calculating means for receiving a reset signal;
    and wherein said calculating means calculates said position data to indicate movement of the tag from a time when the reset means received the reset signal.

12. A tag according to claim 11, wherein said interrogation signal is said reset signal.

13. A tag according to claim 8, further comprising:
    reset means coupled to said calculating means for receiving a reset signal;
    and wherein said calculating means calculates said position data to indicate movement of the tag from a time when the reset means received the reset signal.

14. A tag according to claim 8, wherein:
    said calculating means calculates a current direction of motion of the tag based on the sensor information; and
    said second transmitting means transmits to an interrogation gate data indicative of the current direction of motion calculated by said calculating means.

15. A tag according to claim 8, wherein said second transmitting means includes a radio frequency transmitter.

* * * * *